Sept. 22, 1953      L. R. SPOONER      2,652,589
HOG DROPPER DEVICE

Filed April 2, 1948      3 Sheets-Sheet 1

INVENTOR.
Lee Roy Spooner
BY
R. G. Story
ATTORNEY

Sept. 22, 1953

L. R. SPOONER 2,652,589

HOG DROPPER DEVICE

Filed April 2, 1948

INVENTOR.
Lee Roy Spooner
BY
R.G. Story
ATTORNEY

Sept. 22, 1953   L. R. SPOONER   2,652,589
HOG DROPPER DEVICE
Filed April 2, 1948   3 Sheets-Sheet 3
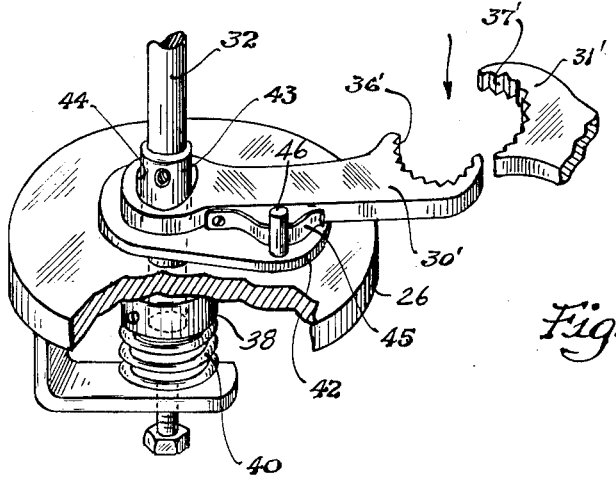
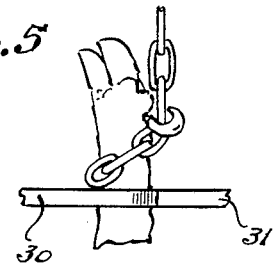
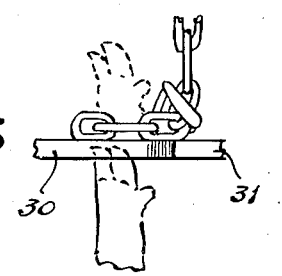
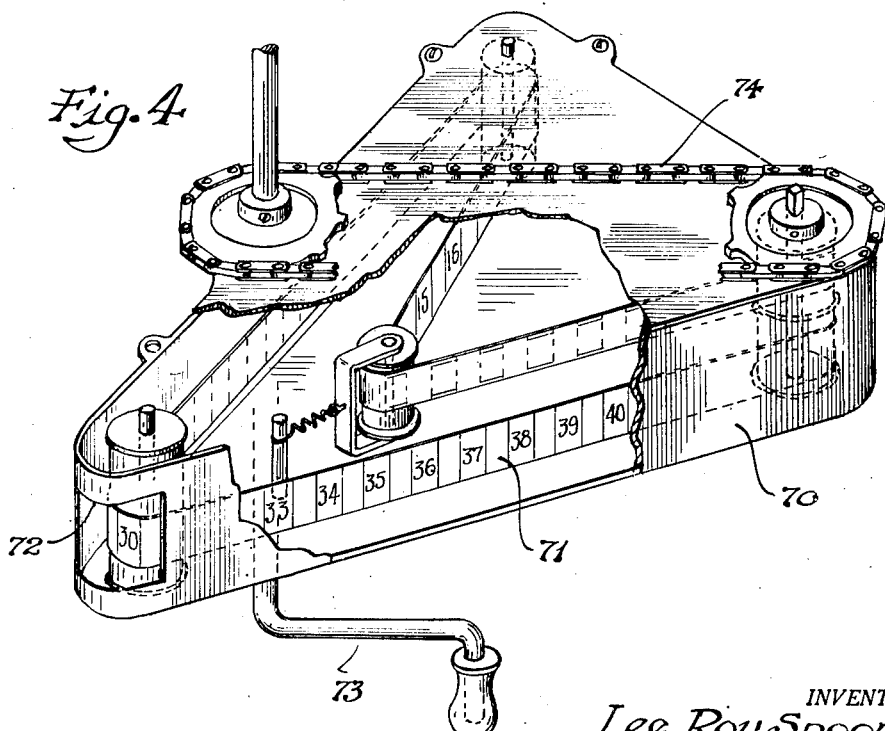
INVENTOR.
Lee Roy Spooner
BY
R. G. Story
ATTORNEY Patented Sept. 22, 1953

2,652,589

UNITED STATES PATENT OFFICE 2,652,589

HOG DROPPER DEVICE

Lee R. Spooner, Watertown, S. Dak., assignor, by mesne assignments, to Swift & Company, a corporation of Illinois Application April 2, 1948, Serial No. 18,595

8 Claims. (Cl. 17—24)

1

This invention relates to means useful in the slaughter of animals, and more particularly to a machine for automatically unshackling animals suspended from an overhead rail.

It is an object of this invention to provide improved means to release animal carcasses from their shackles as they move along an overhead suspension system.

Another object of this invention is to provide means moving with a suspended carcass to engage the shackle to effect release of the animal.

Another object of the invention is to provide a means engaging the leg of a carcass under the chain by which the carcass is suspended so as to suddenly, in effect, lift the chain looped around the extremity in a manner to release the animal from the shackle.

Another object of this invention is to provide a means and method for releasing carcasses from an overhead suspension system in a particular timed sequence.

Other objects will appear below.

In the drawings:

Figure 3 is a detailed perspective view of a modified form of the actual shackle releasing element;

Figure 4 is a perspective view, partly broken away and with the top of the casing removed, showing the detailed structure of a speed or dropping sequence indicator device;

Figure 5 is a detail side elevation of the shackle releasing means just as they come into position around the shackled leg of a carcass; and Figure 6 is a view similar to Figure 5 but showing the relation of the elements after the carcass has been lowered to bring the shackling chain against the releasing means.

Figure 1:
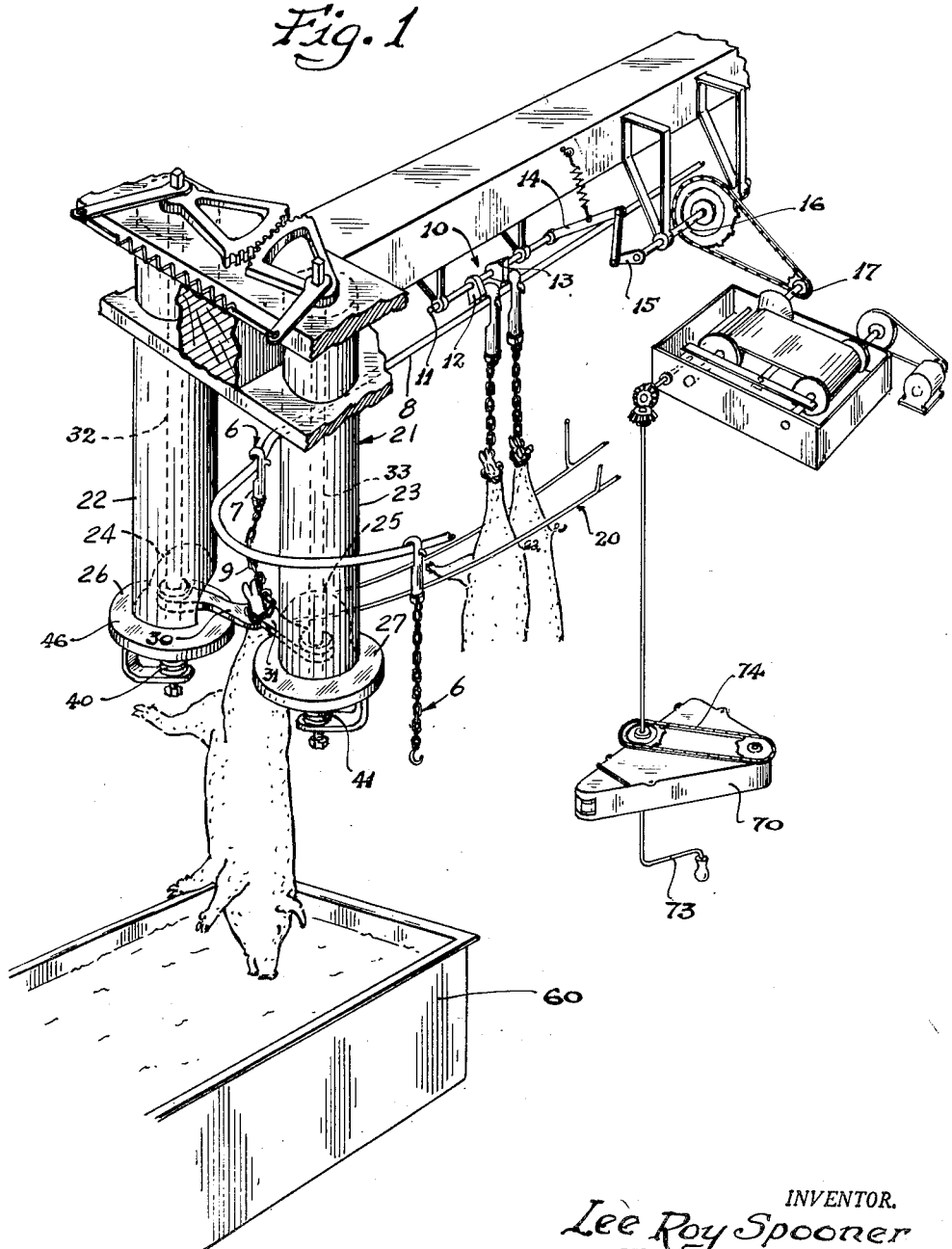
Figure 1 is a perspective view of the preferred construction of this invention, partly broken away, showing the outlet end of the bleed rail conveying system of a hog slaughtering line and its relation to scalding tank.

This invention provides a machine adapted to mass production operations such as are practiced at the large packing house establishments, and at these plants the usual steps followed in the slaughtering of certain animals include a bleeding operation. The bleeding of the carcass is performed after the animal has been dispatched. A typical example of this operation is found in the handling of hogs wherein the bleeding is completed while the hogs' carcasses are suspended

2 from an overhead conveyor system called a "bleeding rail." After bleeding has been completed, the carcasses are delivered from this conveyor to the next operation, which is usually the scalding operation.

The individual hog carcasses are each suspended from the bleeding rail with the head end down so that the blood will quickly drain from the carcass. Thus, the carcasses are each carried by one of the hind legs of the animal that is connected to a shackle means 6 which is adapted to ride along the conveyor system. This shackle means 6 usually takes the form of a carriage 7 which in the illustrated embodiment is in the form of a hook for engaging with the conveyor comprising a rail 8 in the illustrated embodiment, the carriage having a chain 9 dangling therefrom which is adapted to be formed in a more or less loose loop around one of the hind legs of the animal's carcass. When the shackle is lifted, the loop of the chain is drawn around the leg in a manner to frictionally bind the leg whereby to hold the carcass suspended.

After the carcass has been bled, the animal is lowered from the bleeding rail, and heretofore it has always been necessary to manually unhook the shackle chain to free the animal's extremity. The carcass is dropped onto a table where this may be done, and the carcass is then pushed into the scalding tank or may be held in a cold-water-soaking reservoir until several carcasses have been collected. In the past machines have been proposed to relieve some of the manual labor involved in this operation, but none of these machines has been found to be entirely satisfactory in commercial operations. The present invention has been made as an improvement upon all known prior art types of machines for this purpose.

Basically this invention provides means that co-act with the shackle chain to release it, by relatively lifting the chain looped around the animal's extremity while the carcass is being "dropped" from the bleeding rail. In following this procedure the tension of the chain loop around the leg is momentarily slackened, whereupon the carcass is free to fall.

The preferred form of the device is shown in the drawings, and referring more particularly to Figure 1, as there represented, a line of shackled hog carcasses is shown as having moved up into position in front of a gate mechanism or timing device 10, which is adapted to intermittently release individual carcasses from the conveyor line for passage to the dropping device.

The timing mechanism 10 takes the form of an oscillating shaft 11, on which are mounted the spaced gate elements 12 and 13, which are disposed approximately at right angles with respect to each other. As the shaft 11 is oscillated, first one gate element 12 and then the other gate element 13 come into contact with the carriages of the shackles which slide along the bleeding rail. The spacing between the gate elements 12 and 13 is such that when a line of shackled carcasses is held on the bleeding rail behind gate element 12, and gate element 13 is driven downwardly into engagement with the shackle carriages, the gate 13 fits between the first and second of the carriages of the line. Thereafter, because of the approximate 90° spacing of the gate elements, the first shackle on the line is released while the remaining shackles, from the second one in line back, are held by gate element 13. After the first shackle has passed from under the releasing mechanism, the shaft 11 is oscillated to withdraw the gate 13 from contact with the line of shackles, while gate 12 comes into position to catch the line as it moves forwardly on the bleeding rail.

The shaft 11 is oscillated by a lever 14, which is connected by a link to a crank 15, which may be driven from any suitable source. In the preferred form of this invention the crank 15 is mounted on the end of the driven shaft 16, which is driven from the shaft 17 that forms the output of a Reeves pulley-type of variable speed drive. The Reeves speed changer may be driven from any suitable source of power.

Figure 2:
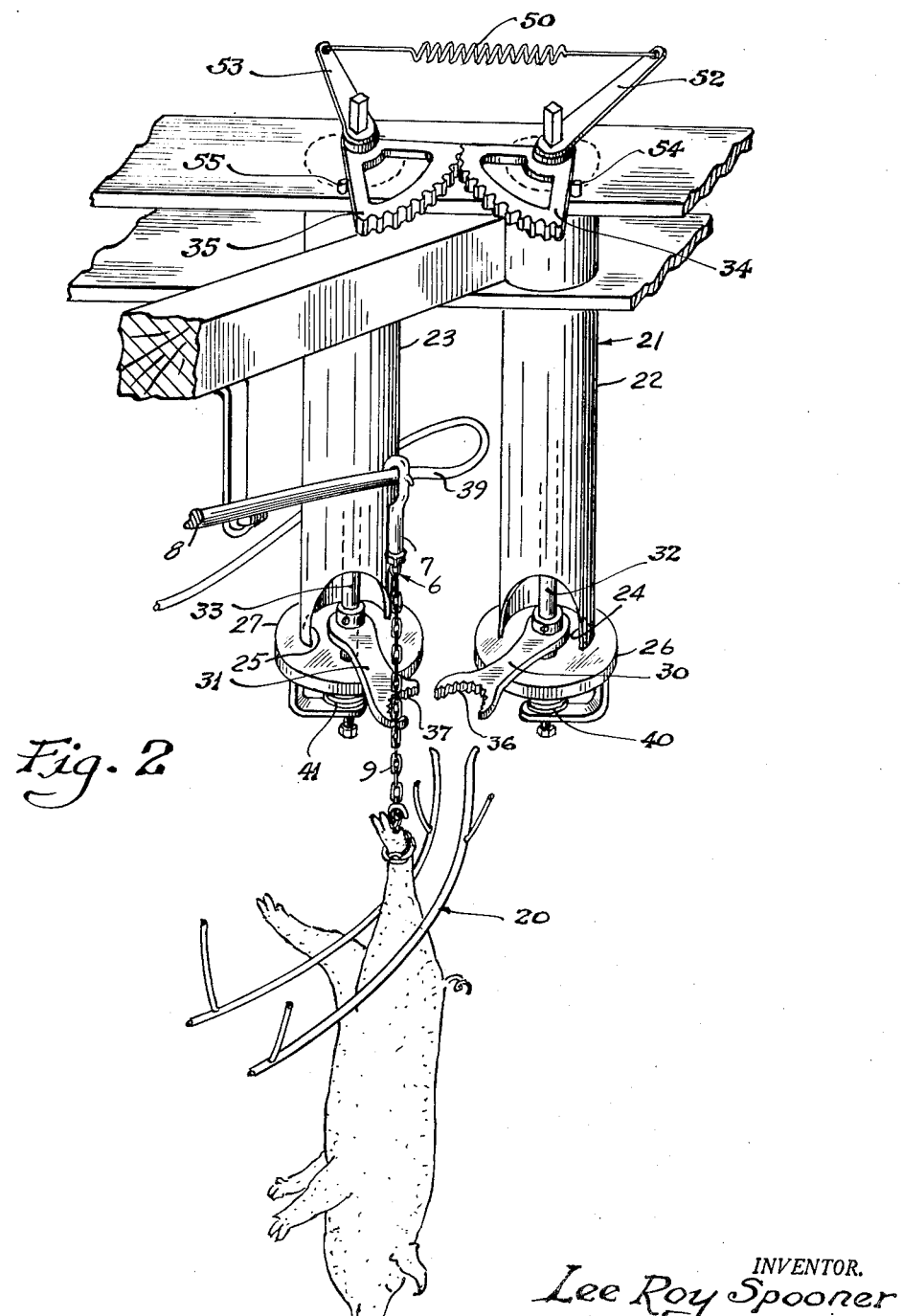
Figure 2 is a prospective view of the shackle releasing means showing a shackled hog carcass in position to pass into the dropping means.

After the carriage of a shackled hog carcass has been passed by the gate mechanism, the shackled extremity of the carcass is engaged by a suitable steadying and guide means 20 which directs the extremity into contact with a dropping mechanism. The dropping mechanism is mounted on a frame, generally 21, which includes a pair of generally cylindrical elements 22 and 23, the lower ends of which are partially cut away as illustrated at 24 and 25. Attached to the lower ends of the cylindrical elements 22 and 23 are a pair of plates 26 and 27, respectively. The dropping means takes the form of a pair of cooperating arms 30 and 31 mounted on opposite sides of the bleeding rail. The arms are carried on the rotatable shafts 32 and 33, respectively, and at their upper ends each of the shafts is splined to a pair of meshing gear segments 34 and 35. At their free ends, each of the arms 30 and 31 is provided with a generally semicircle jaw element 36 and 37, respectively, which together are adapted to substantially surround the shackled extremity of the hog's carcass, when the arms close together as shown in Figure 1. It will be noted, referring to Figure 2, that the jaw element 36 of the arm 30 is disposed across the path of travel of the shackled extremity of the hog at the outlet end of guide 20 so as to catch the hog's leg as the shackle moves forwardly along the conveyor rail. The continued forward motion of the carcass drives the arm 30 before the hog's leg, and this turns the shaft 32 which is fixed to the arm. Shaft 32 turns gear 34, and through the meshing gears 34 and 35 and shaft 33, the arm 31 is driven into a position immediately behind the hog's leg whereby the jaws 36 and 37 substantially surround the shackled extremity.

The arms 30 and 31 are positioned with respect to the bleeding rail and the shackle arrangement such that the jaws 36 and 37 close about the shackled leg of the hog carcass at a point just below the loop of the shackle chain. As soon as the jaws 36 and 37 have been driven to their closed or leg-encircling position, the shackle carriage moves into a downhill section 39 of the conveyor line to quickly drop or lower the carcass. Then, as the shackled extremity moves downwardly, the loop of the shackle chain, which encircles the leg, falls against the upper surfaces of the jaws 36 and 37. When the chain loop drops against the jaws, this releases the frictional engagement of the chain from around the leg so that the hog's leg can fall free. This action is shown in Figures 5 and 6 of the drawings. Figure 5 shows the relationship of the jaws and chain loop just as the jaws close around the leg, and Figure 6 shows how the jaw elements serve to strip the chain loop from the leg when the carcass is dropped.

The arms 30 and 31 of the dropping device are not only mounted for swinging movement, but are also supported in a manner to have a limited resilient vertical movement. This is accomplished by giving each of the lower ends of the arm-supporting system including shafts 32 and 33 and, when used, plates 42, a bearing on springs 40 and 41, respectively, which hold the arms 30 and 31 biased toward their uppermost positions. A collar 38 attached to shafts 32 and 33, see Fig. 3, rests on springs 40 and 41 to support the shafts from the frame. During normal operation, it is possible that some of the shackled legs may not be immediately released when the carcass is dropped, and when this condition is encountered, the springs 40 and 41 are compressed as the arms are dragged down with the leg. The springs 40 and 41 are tensioned to such a degree as to ensure the positive engagement of the arms against the chain loop to slip it off the hog's leg as the dropping of the carcass proceeds. In extreme cases, the chain may be so tightly engaged as to cause the arms to fall against the plates 26 and 27, and when the arms are suddenly stopped in their downward fall with the carcass, the jarring action functions to loosen the chain loop, whereby the carcass is freed from the shackle.

After the leg has been released from the shackled chain and the hog carcass drops into the scalding tank, the arms 30 and 31 are returned to their initial position by means of spring 50. This spring is mounted with its opposite ends fixed to arms 52 and 53, which in turn are keyed to shifts 32 and 33. Any suitable stop mechanism, as pins 54 and 55, may be provided to hold the arms 30 and 31 in the neutral starting position.

A modified form of arm arrangement is shown in Figure 3. This variation may be provided to avoid any strain on the arm mounting whenever an unduly large leg is encountered. With this structure a lost motion connection is provided between the arm 30', for example, and shaft 32. The arm 30' is loosely carried on a plate 42 that is keyed to shaft 32 by means of collar 43 integral with the plate. The arm 30' is provided with a large aperture 44, and the arm is mounted over plate 42 with the aperture surrounding collar 43. A spring 45 is mounted on the side of arm 30', and the spring engages against a post 46 fixed in the plate 42 to normally bias to arm 30' in a counter-clockwise direction with respect to Figure 3. The arm 30' is operative in the same manner as arm 30, described above. If, however, an extra thick leg is driven into jaw 36' of arm 30', the mounting construction will permit the arm 30' to give with respect to the cooperating arm 31 because of the lost motion connection. When the larger leg drops through, the jaw 30' returns to its normal position corresponding to arm 30.

As above indicated, the hog carcasses fall from the dropping device into a tank 60 containing hot water whereby the carcass is scalded to condition it for subsequent operations. The skin of the hog is cleaned and the bristles on the carcass are softened so that they may be more easily removed from the hide. It is important that the carcasses be soaked for a period of time sufficient to loosen the dirt and soften the hair, and yet, it is uneconomical to continue the soaking process any longer than is necessary to properly condition the carcasses.

A further development of the present invention makes use of a timed sequence of dropping the carcasses to feed them into the scalding tank. In this further aspect of the invention, the timed dropping of the hogs is used to indicate the proper soaking time for the carcasses.

It will be observed that an operator standing at the outlet from the dropping means, and knowing the time interval at which the carcasses are being fed into the dropping device, i. e., the number of carcasses being dropped per minute, can, by simple calculation, determine how many hog carcasses should be in the scalding tank in order to produce a given time period of soaking on the carcass. The scalding tank is usually arranged to provide a narrow path for the carcasses to float through, and as each new carcass drops into the scalding tank, a carcass that has completed its soak can be withdrawn at the opposite end. For example, if the carcass is to be soaked for 5 minutes in scalding water and 4 carcasses are dropping into the tank every minute, the operator should see that 20 carcasses are in the soaking tank at all times. As soon as the 20th hog has been dropped into the tank, the first hog is removed at the opposite end of the soaking tank, and it will have had 5 minutes of soaking. As each new carcass drops into the soaking tank, the last carcass in the tank is removed so that the timing of the soaking is accomplished from a knowledge of the timing of carcasses feeding into the dropping arrangement.

Preferably an indicator device is arranged for convenient observation by the operator, and the indicator may be coupled with a shifting arrangement for the Reeves-type variable speed drive so that the indicator may be automatically set when the variable speed drive is changed from one setting to another. The indicator is marked with indicia to inform the operator as to how many hogs are being dropped per minute. It may and preferably also does include other indicia showing the number of hogs that should be soaking in the scalding tank 60 for the given speed.

A suitable indicator mechanism is shown in Figure 4 in the drawings wherein a triangular-shaped case 70 is provided in which a tape 71 is mounted for movement past a window 72. The tape may be supported on a series of spools with a suitable resilient takeup mechanism for the slack resulting from winding and unwinding the tape from the supporting spools. The tape may be driven around on the spool arrangement from a crank 73 through sprocket chain 74, and the tape 71 is positively moved in accordance with the setting of the crank 73. As shown more particularly in Figure 1, the crank 73 is connected directly to the variable speed drive for the timer 10, which controls the admission of carcasses to the dropping device, and thus, as the variable speed drive is set, the indicator tape is automatically moved to show the particular setting.

Any conventional kind of variable speed drive may be used, but the simple Reeves-type drive has been found to be quite operative for this purpose. The indicator is preferably calibrated from the ultimate output of the dropping device. When this is done, the indicator is automatically compensated for intermediate losses in the driving system, and a more accurate indication of the soaking time in the scalding tank is had.

The above-described device is operative to handle a steady flow of hog carcasses coming from a killing station. After a given hourly volume or rate of production is decided upon, the timer arrangement may be set and the dropping of the hogs into the scalding tank begun.

After each carriage and its suspended carcass passes through the timing gate mechanism, the shackled carcass passes to the dropping device. The arms 30 and 31 are carried forwardly by the movement of the carcass as the carriage moves along the conveyor, and the underside of the loop of the shackle chain around the leg of the carcass is engaged on the top surface of the jaws 36 and 37. Thereafter, as the carriage drops down section 39 of the conveyor rail, the loop is released and the leg falls free, whereby the carcass drops into the scalding tank. The shackle carriage continues past the dropping station on the conveyor rail and moves onto a return rail whereby it may be delivered back to the killing station. It is seen that the release of the shackle chain is accomplished automatically and the shackle is never removed from the conveyor. Therefore, the operator needs merely supervise the operation of the machine.

As the hog carcasses drop from the automatic dropper, they may be passed into a scalding tank, and the timed dropping of the carcasses may be used to provide an indication for controlling the movement of the carcasses through the scalding tank. As the operator counts the dropping of the carcasses into the scalding tank, he directs the removal of the finished carcasses from the scalding tank. An indicator device may be used to assist the operator in controlling the scalding operation.

It should be noted that the indicator structure and method of using it to produce a predetermined output from a machine may have application in arts other than merely the above-described hog-carcass dropping device. It is obvious that wherever a knowledge of the rate of output of a system is important, a calibration of the variable infeed drive mechanism can be made so that while simultaneously setting the drive, an indication of the output of the system is automatically had. In such case it is, of course, essential that the calibration of the indicator device be made while the indicator is connected with the drive of the system at a point where no subsequent loss of driving motion due to slippage in the drive system is possible, and that the driven machine or production system have such a positive motion in connection with the material being worked upon whereby no variable slippage can take place relative to the material.

The description given above covers the preferred form of this machine. It is obvious, however, that many modifications thereof may occur to those skilled in the art, which will fall within the scope of the following claims.

I claim:

1. A machine for dropping animal carcasses from a shackle of the type which includes a chain looped around one of the extremities of the carcass, which shackle is supported from an overhead conveyor unit for movement along a given path, said machine including a frame, a detaching unit having a pair of supporting members, said members having recessed portions therein, said supporting members being movably mounted from said frame with said portions positioned at a point along said path to receive said extremity below the loop of the chain, and actuating means associated with the supporting members to move one of said supporting members toward the other of the members to substantially surround said extremity in response to a movement of a carcass forwardly against the other of the members, at least one of said units being constructed and arranged to approach the other of the units beyond said point along said path to release the weight of the carcass from the shackle to bring said loop into contact with the upper surfaces of said members to slacken the chain whereby the chain may be slipped from the extremity.

2. A machine for dropping animal carcasses from a shackle of the type which includes a chain looped around one of the extremities of the carcass, which shackle is supported from an overhead conveyor for movement along a given path, said machine including a frame, a pair of supporting members having recessed portions therein, said members being movably mounted from said frame with said portions positioned to receive said extremity below the loop of the chain, and actuating means associated with the supporting members to move said supporting members to substantially surround said extremity in response to a movement of a carcass forwardly along a portion of said path, said conveyor descending over said portion of the path to bring said loop into contact with the said members to slacken the chain whereby the chain may be slipped from the extremity.

3. A machine for dropping animal carcasses from a shackle of the type which includes a chain looped around one of the extremities of the carcass, which shackle is supported from an overhead conveyor unit for movement along a given path in a predetermined direction, said machine including a frame, a pair of spaced shafts journaled in said frame, a detaching unit comprising a pair of arms, one end of each of said arms being mounted on said shafts and positioned to either side of said path adjacent a point on said path, the other end of said arms having a configuration to fit about said extremity, interconnecting means between said two shafts to rotate the shafts in unison, said interconnecting means being constructed and arranged to normally position said shafts so that said other end of at least one of the arms intersects said path rearwardly, with respect to the direction of movement, of said point below the loop of the chain whereby the movement of the extremity along said path from said intersection will rotate said arms to fit said other ends of said arms about said extremity below said loop, one of said units being constructed and arranged to approach the other of the units as said arms fit about said extremity to bring said loop into contact with said arms to slacken the chain whereby the chain may be slipped from the extremity.

4. A machine for dropping animal carcasses from a shackle of the type which includes a chain unit looped around one of the extremities of the carcass, which shackle is supported from an overhead conveyor for movement along a given path in a predetermined direction, said machine including a frame, a pair of spaced shafts journaled in said frame to either side of a point in said path, a detaching unit comprising a pair of substantially horizontal arms each having a jaw at one end thereof, each of said arms having the other end thereof mounted on one of said shafts, intermeshing gear segments on each of said shafts, and resilient means urging said arms into a first position wherein at least one of said jaws intersects said path at a point rearwardly, with respect to the direction of movement, of said point and below the loop of the chain whereby the movement of the extremity along said path will rotate said arms toward a second position and close said jaws about said extremity below said loop, one of said units being constructed and arranged to approach the other of the units at said point to bring said loop into contact with the upper surfaces of said arms to slacken the chain whereby the chain may be slipped from the extremity.

5. A machine for dropping animal carcasses from a shackle of the type which includes a chain looped around one of the extremities of the carcass, which shackle is supported from an overhead conveyor unit for movement along a given path in a predetermined direction, said machine including a frame, a pair of spaced vertical shafts journaled in said frame to either side of a point in said path, a pair of horizontal arms, each having a jaw at one end thereof, each of said arms having the other end thereof mounted on one of said shafts, intermeshing gear segments on each of said shafts, and resilient means urging said arms into a first position wherein at least one of said jaws intersects said path rearwardly, with respect to the direction of movement, of said point and below the loop of the chain whereby the movement of the extremity along said path will rotate said arms toward a second position and close said jaws about said extremity below said loops, said conveyor descending over the portion of the path traversed as said arms are moving from the first to the second position to bring said loop into contact with the upper surfaces of said arms to slacken the chain whereby the chain may be slipped from the extremity.

6. A machine for dropping animal carcasses from a shackle of the type which includes a chain looped around one of the extremities of the carcass, which shackle is supported from an overhead conveyor unit for movement along a given path in a predetermined direction, said machine including a frame, a detaching unit comprising a pair of arms, mounting means including a pair of vertical shafts journaled in said frame and positioned to either side of a point in said path, one end of one of said arms being attached to one of the shafts, one end of the other of the arms being operatively connected to the other of the shafts through a lost-motion connection, and resilient means to permit said arms to descend in response to loading thereon, the other ends of each of said arms having a configuration to fit about said extremity, and interconnecting means between said two shafts to rotate the shafts in unison, said interconnecting means being constructed and arranged to normally position said shafts with said other end of at least one of the arms intersecting said path rearwardly, with respect to the direction of movement, of said point and below the loop of the chain whereby the movement of the extremity along said path from said intersection will rotate said arms to fit said other ends of said arms about said extremity below said loop, one of said units being constructed and arranged to approach the other of the units as said arms fit about said extremity to bring said loop into contact with said arms to slacken the chain whereby the chain may be slipped from the extremity.

7. A device for supporting and dropping animal carcasses comprising a shackle having a chain for looping around one of the extremities of the carcass, an overhead conveyor unit to support said shackle and carcass for movement along a given path, a frame, a detaching unit having a pair of supporting members, said members having recessed portions therein, said supporting members being movably mounted from said frame with said portions positioned to receive said extremity below the loop of the chain, and actuating means associated with the supporting members to move said supporting members to substantially surround said extremity in response to a movement of a carcass forwardly along a portion of said path, at least one of said units being constructed and arranged to approach the other of the units at said portion of said path to release the weight of the carcass from the shackle to bring said loop into contact with the upper surfaces of said members to slacken the chain whereby the chain may be slipped from the extremity.

8. A device for supporting and dropping animal carcasses comprising a shackle having a chain for looping around one of the extremities of the carcass, an overhead conveyor unit to support said shackle and carcass for movement along a given path in a predetermined direction, a frame, a pair of spaced vertical shafts journaled in said frame to either side of a point in said path, a pair of horizontal arms, each having a jaw at one end thereof, each of said arms having the other end thereof mounted on one of said shafts, intermeshing gear segments on each of said shafts, and resilient means urging said arms into a first position wherein at least one of said jaws intersects said path rearwardly, with respect to the direction of movement, of said point and below the loop of the chain whereby the movement of the extremity along said path will rotate said arms toward a second position and close said jaws about said extremity below said loops, said conveyor descending over the portion of the path traversed as said arms are moving from the first to the second position to bring said loop into contact with the upper surfaces of said arms to slacken the chain whereby the chain may be slipped from the extremity.

LEE R. SPOONER.

References Cited in the file of this patent

UNITED STATES PATENTS

| Number | Name | Date |
|---|---|---|
| 2,052,749 | Brewster | Sept. 1, 1936 |
| 2,078,503 | Meiser | Apr. 27, 1937 |
| 2,153,071 | Bishop | Apr. 4, 1939 |
| 2,159,623 | Schmidt | May 23, 1939 |
| 2,401,942 | Fiell | June 11, 1946 |